United States Patent

Wallin et al.

[11] Patent Number: 5,993,986
[45] Date of Patent: *Nov. 30, 1999

[54] SOLIDE OXIDE FUEL CELL STACK WITH COMPOSITE ELECTRODES AND METHOD FOR MAKING

[75] Inventors: Sten A. Wallin; Sunil D. Wijeyesekera, both of Midland, Mich.

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/846,362

[22] Filed: Apr. 30, 1997

Related U.S. Application Data

[63] Continuation-in-part of application No. 08/559,582, Nov. 16, 1995, Pat. No. 5,670,270.

[51] Int. Cl.⁶ .............................. H01M 8/12; H01M 4/88
[52] U.S. Cl. .............................. 429/32; 429/45; 427/115; 502/101
[58] Field of Search ................. 429/32, 45; 502/101; 427/115

[56] References Cited

U.S. PATENT DOCUMENTS

| | | | |
|---|---|---|---|
| 3,377,203 | 4/1968 | Möbius et al. | 136/86 |
| 3,460,991 | 8/1969 | White, Jr. | 136/86 |
| 3,522,097 | 7/1970 | Tedmon, Jr. et al. | 136/86 |
| 3,533,849 | 10/1970 | Mitoff | 136/86 |
| 3,573,993 | 4/1971 | Pabst et al. | 136/120 |
| 3,979,227 | 9/1976 | Katz et al. | 427/115 |
| 4,459,341 | 7/1984 | Marchant et al. | 429/33 |
| 4,686,158 | 8/1987 | Nishi et al. | 429/26 |
| 4,702,971 | 10/1987 | Isenberg | 429/31 |
| 4,767,518 | 8/1988 | Maskalick | 204/242 |

(List continued on next page.)

FOREIGN PATENT DOCUMENTS

| | | | |
|---|---|---|---|
| 0 275 356 | 7/1988 | European Pat. Off. | H01M 8/12 |
| 4314323A1 | 11/1994 | Germany | C04B 35/00 |
| 3-81959 | 4/1991 | Japan | H01M 4/86 |
| 5-54896 | 3/1993 | Japan | H01M 8/02 |
| 5-325981 | 12/1993 | Japan | H01M 4/86 |
| 2284599 | 6/1995 | United Kingdom | C22C 29/00 |

OTHER PUBLICATIONS

Tedmon, Jr., et al., "Cathode Materials and Performance in High–Temperature Zirconia Electrolyte Fuel Cells", *J. Electrochem. Soc.: Electrochecmical Science*, Sep. 1969, pp. 1170–1175.

(List continued on next page.)

*Primary Examiner*—Stephen Kalafut
*Attorney, Agent, or Firm*—R. J. Edwards; Eric Marich

[57] ABSTRACT

A planar solid oxide fuel cell stack has a number of fuel cells (anode/electrolyte/cathode) connected in series by a gas tight, electrically conductive interconnection in which at least one electrode is a porous composite of a contiguous network of an ionically conductive material or phase, a contiguous network of an electrically conductive material or phase, and a highly efficient electrocatalyst material or phase which is dispersed within the pores of the electrode so that the electrocatalyst material or phase particles are in contact with both the ionically conductive material or phase and the electrically conductive material or phase. The electrocatalyst particles are introduced into the electrode of the assembled stack by infiltrating the pores of the electrode with a precursor solution through the fuel gas or oxidant gas manifolding connections, respectively. The stack assembly is then heat treated to form small, highly active particles of the dispersed electrocatalyst material or phase within the electrode.

19 Claims, 9 Drawing Sheets

U.S. PATENT DOCUMENTS

| | | | |
|---|---|---|---|
| 4,770,955 | 9/1988 | Ruhl | 429/33 |
| 4,789,561 | 12/1988 | Schäefer et al. | 427/126.1 |
| 4,847,173 | 7/1989 | Mitsunaga et al. | 429/41 |
| 4,851,303 | 7/1989 | Madou et al. | 429/13 |
| 4,885,078 | 12/1989 | Spengler et al. | 204/432 |
| 4,894,297 | 1/1990 | Singh et al. | 429/31 |
| 4,948,680 | 8/1990 | Madou et al. | 429/13 |
| 4,997,725 | 3/1991 | Pujare et al. | 429/17 |
| 5,001,021 | 3/1991 | Maricle et al. | 429/13 |
| 5,021,304 | 6/1991 | Ruka et al. | 429/30 |
| 5,037,525 | 8/1991 | Badwal | 204/421 |
| 5,057,362 | 10/1991 | Schroeder et al. | 428/312.2 |
| 5,064,733 | 11/1991 | Krist et al. | 429/17 |
| 5,106,706 | 4/1992 | Singh et al. | 429/31 |
| 5,114,803 | 5/1992 | Ishihara et al. | 429/30 |
| 5,122,425 | 6/1992 | Yoshida et al. | 429/33 |
| 5,143,801 | 9/1992 | Bates | 429/33 |
| 5,298,235 | 3/1994 | Worrell et al. | 429/33 |
| 5,298,341 | 3/1994 | Khandkar et al. | 429/32 |
| 5,308,712 | 5/1994 | Seike et al. | 429/30 |
| 5,340,664 | 8/1994 | Hartvigsen | 429/20 |
| 5,342,704 | 8/1994 | Vasilow et al. | 429/31 |
| 5,366,819 | 11/1994 | Hartvigsen et al. | 429/17 |
| 5,385,792 | 1/1995 | Shiratori et al. | 429/32 |
| 5,403,461 | 4/1995 | Tuller et al. | 204/252 |
| 5,409,785 | 4/1995 | Nakano et al. | 429/33 |
| 5,432,023 | 7/1995 | Yamada et al. | 429/34 |
| 5,432,024 | 7/1995 | Soma et al. | 429/44 |
| 5,453,330 | 9/1995 | Kawasaki et al. | 429/30 |
| 5,464,654 | 11/1995 | Mizuno | 427/123 |
| 5,480,738 | 1/1996 | Elangovan et al. | 429/32 |
| 5,543,239 | 8/1996 | Virkar et al. | 429/33 |
| 5,591,537 | 1/1997 | Bagger et al. | 429/33 |
| 5,612,149 | 3/1997 | Hartvigsen et al. | 429/26 |
| 5,620,807 | 4/1997 | Mussell et al. | 429/33 |
| 5,629,103 | 5/1997 | Wersing et al. | 429/33 |
| 5,631,099 | 5/1997 | Hockaday | 502/101 X |
| 5,641,328 | 6/1997 | Ong et al. | 427/115 X |

OTHER PUBLICATIONS

Takeda, et al., "Cathodic Polarization Phenomena of Perovskite Oxide Electrodes with Stabilized Zirconia", *J. Electrochem. Soc. Electrochemical Science and Technology*, Sep. 1987, pp. 2656–2661.

Ishihara et al., "Doped Perovskite Oxide, $PrMnO_3$, as a New Cathode for Solid–Oxide Fuel Cells that Decreases the Operating Temperature", *J. Am. Ceram. Soc.*, vol. 77, No. 6, Jun. 1994, pp. 1682–1684.

Yamamoto et al., "Perovskite–Type Oxides as Oxygen Electrodes for High Termperature Oxide Fuel Cells", *Solid State Ionics* 22, Elsevier Science Publishers B.V., North–Holland, Amsterdam, (1987), pp. 241–246 (Month unknown).

Kamata et al., "Oxygen Reduction Behaviour at the Co–Fired $La_{0.8}Sr_{0.2}MnO_3$/YSZ Interface, as an SOFC Air Electrode", Proceedings of the 1st European Solid Oxide Fuel Cell Forum, Oct. 3–7, 1994, Lucerne–Switzerland, pp. 725–733.

Minh, "Ceramic Fuel Cells", *J. Am. Ceram. Soc.*, 76[3], 1993, pp. 563–589 (Month unknown).

Uchida et al., "New Preparation Method for Polymer–Electrolyte Fuel Cells", *J. Electrochem. Soc.*, vol. 142, No. 2, Feb. 1995, pp. 463–468.

Tai et al. "Tape Casting and Sintering of Strontium–Doped Lanthanum Chromite for a Planar Solid Oxide Fuel Cell Bipolar Plate", *J. Am. Ceram. Soc.*, 74[1], 1991, pp. 155–160 (Month unknown).

Hayashi et al., "Sintering of Lanthanum Chromite Doped with Zinc or Copper", *Journal of Materials Science Letters*, 7, 1988, pp. 457–448 (Month unknown).

Sakai et al., "Sinterability and Electrical Conductivy of Calcium–doped Lanthanum Chromites", *Journal of Materials Science*, 25, 1990, pp. 4531–4534 (Month unknown).

Kawada et al., "Fabrication of a Planar Solid Oxide Fuel Cell by Tape–Casting and Co–Firing Method", *Journal of the Ceramic Society of Japan*, 100[6], 1992, pp. 847–850 (Month unknown).

Meadowcraft et al., "Oxidation and Vaporization Processes in Lanthanum Chromite", *Ceramic Bulletin*, vol. 58, No. 6, 1979, pp. 610–615 (Month unknown).

Yokokawa et al., "Thermodynamic Stabilities of Perovskite Oxides for Electrodes and Other Electrochemical Materials", *Solid State Ionics*, 52, 1992, pp. 43–56 (Month unknown).

Steele, "Oxygen Ion Conductors and Their Technological Applications", *Materials Science and Engineering*, B13, 1992, pp. 79–87 (Month unknown).

WPAT Abstract, 94:161192/20 (1994) For JP–6–89736.
WPAT Abstract, 88:206576/30 (1988) For EP 275356.
WPAT Abstract, 90: 129770/17 (1990) FOR JP 2–80360.
WPAT Abstract, 94: 079443/10 (1994) For JP 6–31169.
JAP10 Abstract, 93: 325981 (1993) For JP 5–325981.
JAPIO Abstract, 93: 029003 (1993) For JP 5–29003.
JAPIO Abstract, 91: 081959 (1991) For JP3–81959.
WPAT Abstract, 94: 071641/09 (1994) For JP6–24702.
JAPIO Abstract, 91: 059953 (1991) For JP3–59953.
JAPIO Abstract, 93: 054896 (1993) For JP5–54896.
Derwent 89–141951/19–Abstract of JP 01–087,545, Sep. 1987.
Derwent 90–302452/40—Abstract of JP 02–215,005, Feb. 1989.
Derwent 90–302453/40—Abstract of JP 02–215,005, Feb. 1989.
Derwent 90–338562/45—Abstract of JP 02–243,768 Mar. 1989.
Derwent 90–338563/45—Abstract of JP 02–243,769 Mar. 1989.
Derwent 92–180619/22—Abstract of JP 04–118–866, Sep. 1990.
Berard, *J. Solid State Chem.*, 1991, 90 (1), 126–46 (CA 114:92581p) Month unknown.
Hayami et al., *Osaka Kogyo Gijutsu Shikenso Kiho 1977*, 28(2), 98–106 (CA 87:174788z) (Month unknown).
Jakobs, et al., *Rev. Chim. Miner.*, 1980, 17(4, 283–98 (CA 94:54839q) (Month unknown).
Ohno et al., *Koen Yoshishu—Kotai Ionikusu Toronkai, 7th*, 1979, 49–50 (CA 92: 132003n) (Month unknown).

T=800°C
Air Flow=512 mL/min
$H_2$ Flow=150 mL/min

T=800°C
Air Flow=507 mL/min
$H_2$ Flow=149 mL/min

T=800°C
Air Flow=894 mL/min
$H_2$ Flow=196 mL/min

T=800°C
Air Flow=507 mL/min
$H_2$ Flow=149 mL/min

T=800°C
Air Flow=507 mL/min
$H_2$ Flow=149mL/min

SOLIDE OXIDE FUEL CELL STACK WITH COMPOSITE ELECTRODES AND METHOD FOR MAKING

CROSS-REFERENCE TO RELATED APPLICATION

This is a continuation-in-part application to Ser. No. 08/559,582 filed Nov. 16, 1995 entitled ELECTRODE STRUCTURE FOR SOLID STATE ELECTROCHEMICAL DEVICES, now U.S. Pat. No. 5,670,270. This parent application Ser. No. 08/559,582, is incorporated here by reference. Unless otherwise stated, definitions of terms in Ser. No. 08/559,582, are valid for this disclosure also.

BACKGROUND OF THE INVENTION

This invention relates to planar solid oxide fuel cell stacks comprising one or more electrodes in contact with a solid state electrolyte.

A solid state electrochemical cell comprises two electrodes, the anode and the cathode, and a dense solid electrolyte membrane which separates the anode and cathode regions of the cell. The anodic and cathodic reactions occur at the anode/electrolyte and cathode/electrolyte interfaces, respectively. The solid electrolyte membrane is a material capable of conducting ionic species, such as oxygen ions, sodium ions, fluoride ions, or hydrogen ions, yet has a low electrical conductivity. The electrolyte membrane must be impermeable to the electrochemical reactants.

It is known to prepare a solid oxide fuel cell comprising a dense electrolyte membrane of a ceramic oxygen ion conductor, a porous anode layer of a conductive ceramic or a metal or, most commonly, a ceramic-metal composite, in contact with the electrolyte membrane on the fuel side of the cell, and a porous cathode layer of an electronically-conductive metal oxide on the oxidant side of the cell, which generates electricity through the electrochemical reaction between a fuel and an oxidant. This net electrochemical reaction involves charge transfer steps that occur at the interface between the ionically-conductive electrolyte membrane, the electronically-conductive electrode and the gas phase (fuel or oxygen).

Electrode structures comprising a porous layer of electrolyte particles on a dense electrolyte membrane with electrocatalyst material on and within the porous layer of electrolyte are known. In such electrodes, the electrocatalyst material is semi-continuous on the surface of the porous electrolyte material to create a three phase boundary (TPB) where the electrolyte material, electrocatalyst, and gas are in contact. The electrode is prepared by applying an electrocatalyst precursor material as a slurry to a porous electrolyte structure, and then heating the precursor material to form the electrocatalyst. However, it is usually necessary to repeat the process of applying the electrocatalyst precursor material to the porous substrate several times in order to provide enough electrocatalyst to obtain a fuel cell with the desired performance characteristics. For fuel cell applications, this method of creating the layer of electrocatalyst in and on the porous electrolyte structure by repeated applications of the electrocatalyst slurry may create more process steps in the preparation of the fuel cell than would be desirable in a commercial manufacturing process. In addition, the performance characteristics of the electrode structure prepared by such processes, such as the voltage at a certain current density, may be less than desirable for certain applications.

U.S. Pat. No. 3,377,203 discloses a method for producing fuel cells of solid electrolyte and ceramic oxide electrode layers by sintering the electrode layers to the electrolyte. U.S. Pat. No. 4,767,518 discloses a solid oxide electrode (anode) made of metal particles that are immobilized by stabilized zirconia which may also contain praseodymium (Pr). The Pr may be added in the form of a solution. U.S. Pat. No. 4,885,078 discloses an electrochemical device which may be a solid oxide cell which comprises a porous electrode containing a deposit of metal oxide or metal salt capable of forming metal oxide upon heating, where the metal may be Pr. U.S. Pat. No. 5,021,304 discloses a method of coating a separate electronically conducted layer on a porous electrode having the steps of applying a mixture of metal salts including nitrates to the electrodes with a surfactant, and heating to form the oxides. Pr oxide is included in a list of dopant oxides which may be used.

SUMMARY OF THE INVENTION

The invention is a planar solid state stack of a plurality of fuel cells, each with an anode/electrolyte/cathode structure. The fuel cells are connected in series by a gas tight, electrically conductive interconnection. The fuel cell stacks having conductive interconnects may be prepared by any suitable method such as, for example, by assembling the stack while the ceramic materials are in the green state and subsequently firing the entire stack, or by firing each cell separately and then assembling the cells into a stack. If desired, a ceramic sealant may be employed to prevent leakage of gases from the individual cells. As used herein, the terms "green" or "green state" refer to the materials after they have been formed into a desired shape, but prior to their being fired at elevated temperatures. At least one electrode in the structure is preferably a porous composite comprising a contiguous network of an ionically conductive material or phase, a contiguous network of an electrically conductive material or phase, and a highly efficient electrocatalyst material or phase, dispersed within the pores of the porous structure so that the electrocatalyst material or phase particles are in contact with both the ionically conductive phase and the electrically conductive material or phase.

The electrocatalyst particles are introduced into the electrode of the assembled stack by infiltrating the pores of the electrode with a precursor solution through the fuel gas or oxidant gas manifolding connections. The stack assembly is then heat treated to form small, highly active particles of the dispersed electrocatalyst material or phase within the electrode. It has been discovered that the electrode structure and process of the invention provide an oxygen electrode/electrolyte assembly which is relatively simple to manufacture, requiring relatively few steps to infiltrate an electrocatalyst precursor material to obtain an electrode structure which will perform advantageously in a solid oxide fuel cell, and which permits the selection of an optimal electronically-conductive material and electrocatalyst.

These and other advantages of the invention will be apparent from the description which follows.

DETAILED DESCRIPTION OF THE INVENTION

Figure 1:
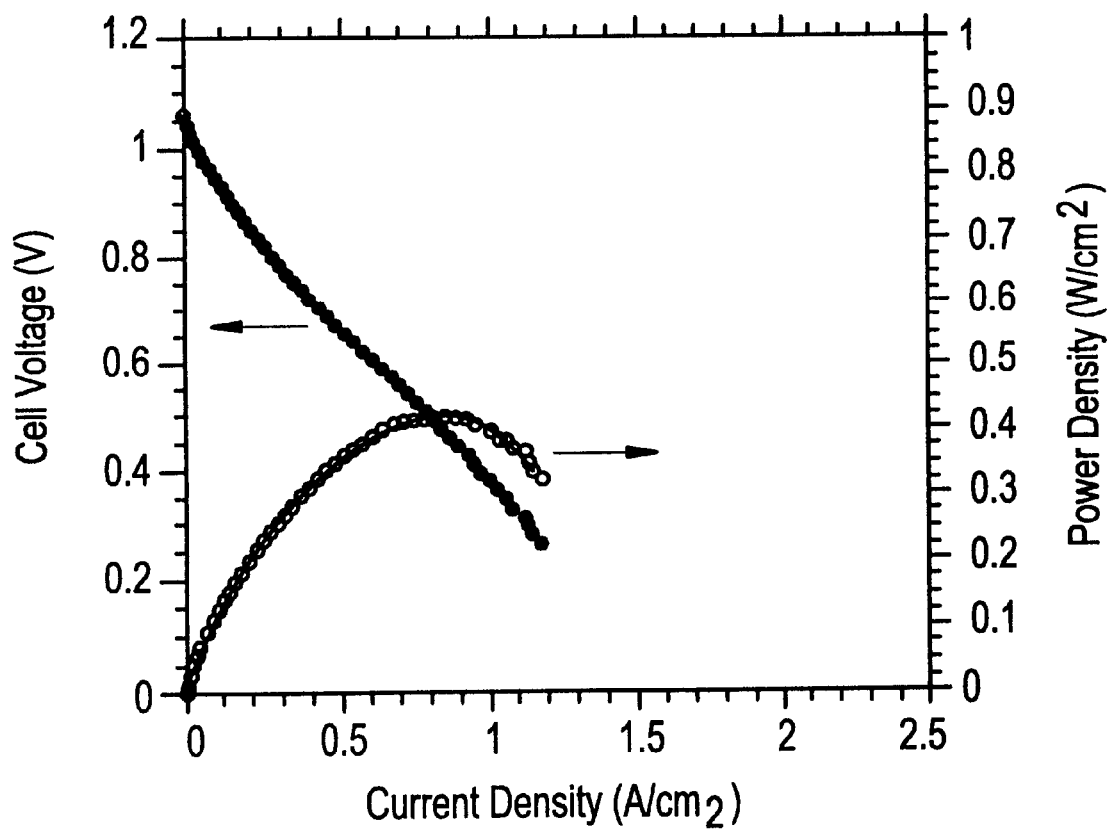
FIGS. 1–5 are graphs each plotting cell voltage and power density against current density and which illustrate the performance of anode/electrolyte/cathode structures both before infiltration (FIG. 1) and prepared and tested in accordance with the invention (FIGS. 2–5)

The following examples are given to illustrate the invention and should not be interpreted as limiting it. Unless stated otherwise, all parts and percentages are given by weight.

A co-fired fuel cell of the invention was made as described in the following paragraphs. As used herein, the term "co-fired" is meant to also include cells which have been fired separately and subsequently assembled with the interconnects into a stack, and then heated sufficiently to seal the connection between the cells and interconnects. Further, the term "catalyst precursor" is meant to include precursors of other types of catalysts (e.g., reforming catalysts).

A 1.25" dia. disk was pressed from 2.5 g of a mixture of NiO(62 wt %)/YSZ(38 wt %). YSZ is yttria stabilized zirconia. The mixture of NiO/YSZ was prepared by ball milling 31.0 g of NiO (Alfa), 19.0 g of YSZ (Tosoh TZ-8Y), and 1.45 g of a styrene/butadiene latex binder in 65 mL of ethanol and 10 mL of water for 1.5 days. A thin coating of YSZ (the ionically conductive electrolyte material) was applied to one face of the NiO/YSZ disk by placing 7 to 8 drops of a dispersion of YSZ in absolute ethanol on the face of the disk and quickly tilting the disk in a circular fashion to completely and as uniformly as possible cover the face of the disk. The dispersion was prepared by sonicating a suspension of 0.5 g of YSZ in 20 mL of absolute ethanol for about 4 minutes with a titanium horn. The coated disk was allowed to dry for 50 minutes under a glass cover dish. The coating procedure was repeated three more times for a total of four applications (this typically yields a sintered YSZ electrolyte membrane about 15 $\mu$m thick).

Next, a coating of a mixture of YSZ (ion conductive material), LSM ($La_{1-a}Sr_aMnO_{3-\delta}$-electronically conductive material), and graphite (fugitive pore-forming material) was applied to the face of the disk which was previously coated with YSZ. The YSZ/LSM/graphite mixture was prepared by sonicating for 4 minutes a suspension of 1.8 g YSZ (Tosoh TZ-8Y), 1.4 g LSM ($La_{0.8}Sr_{0.2}MnO_3$, (Seattle Specialty Ceramics, Seattle, Wash.)) and 1.5 g of graphite (Alfa,−325 mesh size, available from Johnson Matthey) in 22 mL of absolute ethanol. After drying for about 2 hours, the disk was fired to burn out the fugitive pore formers and binder and sinter the structure, according to the following schedule: heat from room temperature to 300° C. in 1:10 (1 hour 10 minutes). 300° C. to 750° C. in 5:00, 750° C. to 800° C. in 1:30, 800° C. to 1200° C. in 2:30, 1200° C. to 1225° C. in 3:00, cool 1225° C. to 1000° C. in 2:00, 1000° C. to 500° C. in 2:30, and then furnace cool from 500° C. to room temperature (RT). After firing, the trilayer disk was about 1.0" dia. and was slightly warped. The trilayer disk was creep flattened by firing under the weight of a setter for 3 hours at 1250° C.

Platinum ink was painted onto the faces of the fuel cell and fired at 900° C. for 1 hour. After cooling, a second coating of Pt ink was applied with silver mesh attached to both the anode and cathode faces of the fuel cell. The cell assembly was then fired for 2 hours at 875° C. The Pt ink and the silver mesh serve as current collectors for the cell testing apparatus and are needed to complete the assembly of the cell.

Cell performance data was obtained at 800° C. using humidified hydrogen (about 3% water) as the fuel gas, and air as the oxidant gas. The air flow across the cathode was maintained at about 500 mL/minute and the fuel flow across the anode maintained at about 150 mL/minute. The current-voltage response of the fuel cell before infiltration is shown in FIG. 1. This data was collected with a Hewlett-Packard DC Electronic Load in constant voltage mode. The cell produced peak power density of 0.41 W/cm$^2$. The slope of the plot of cell voltage vs. current density is the area specific resistance (ASR) of the cell (ASR=0.55 ohm-cm$^2$ from FIG. 1.)

Figure 2:
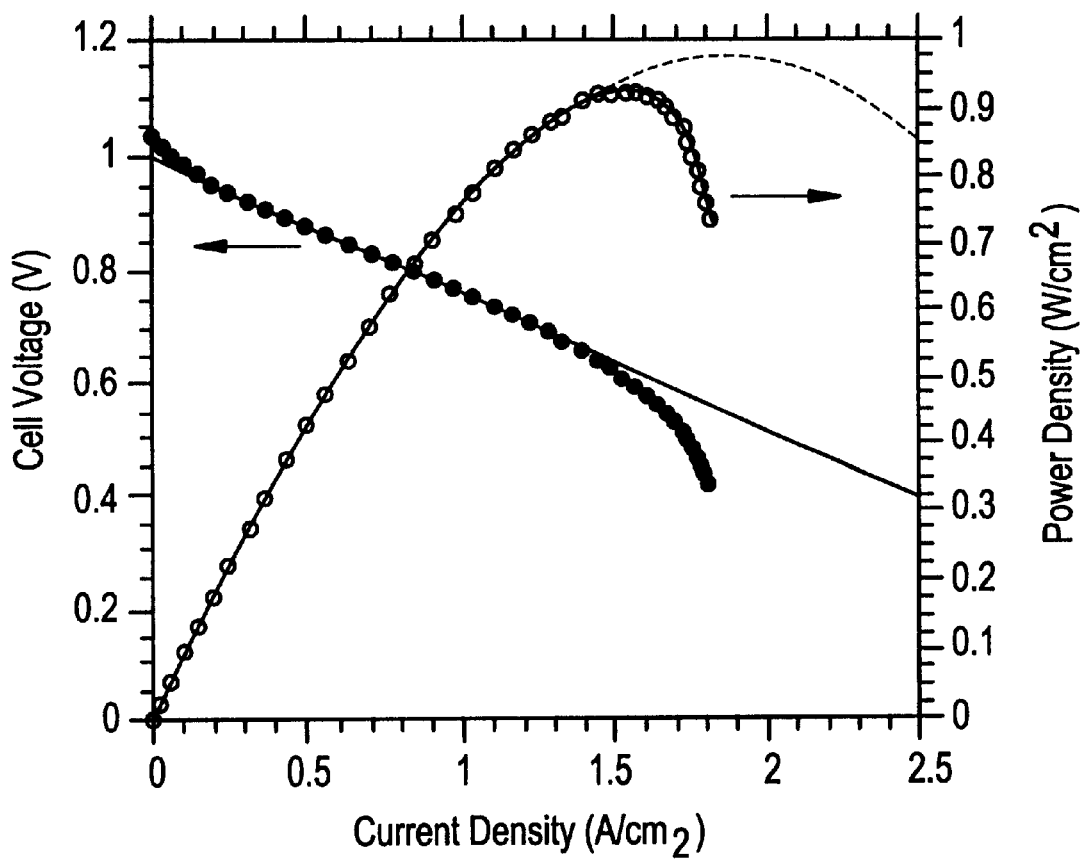
Figure 3:
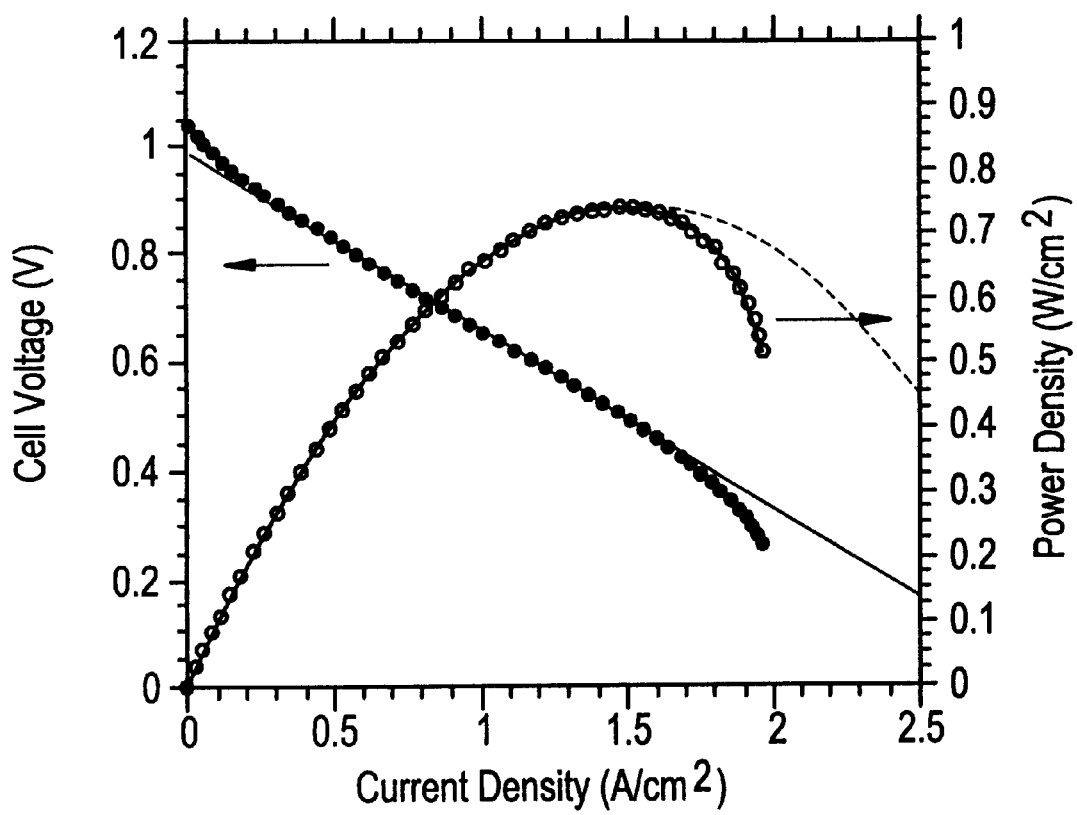
Figure 4:
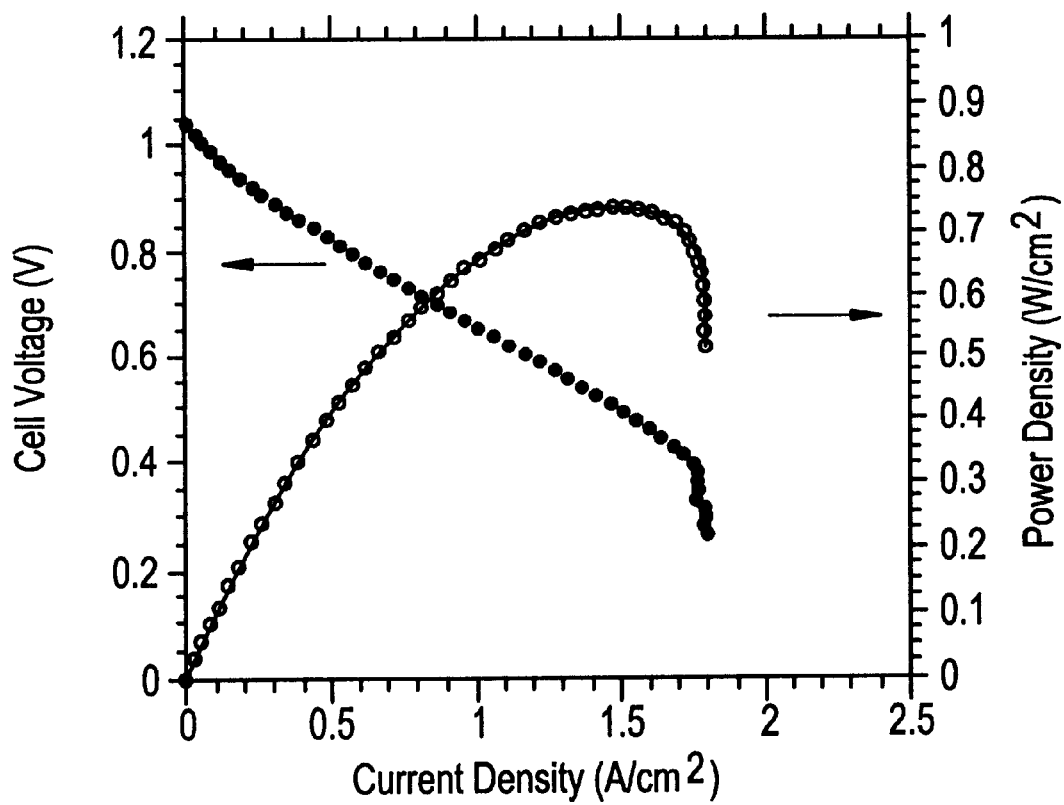
Figure 5:
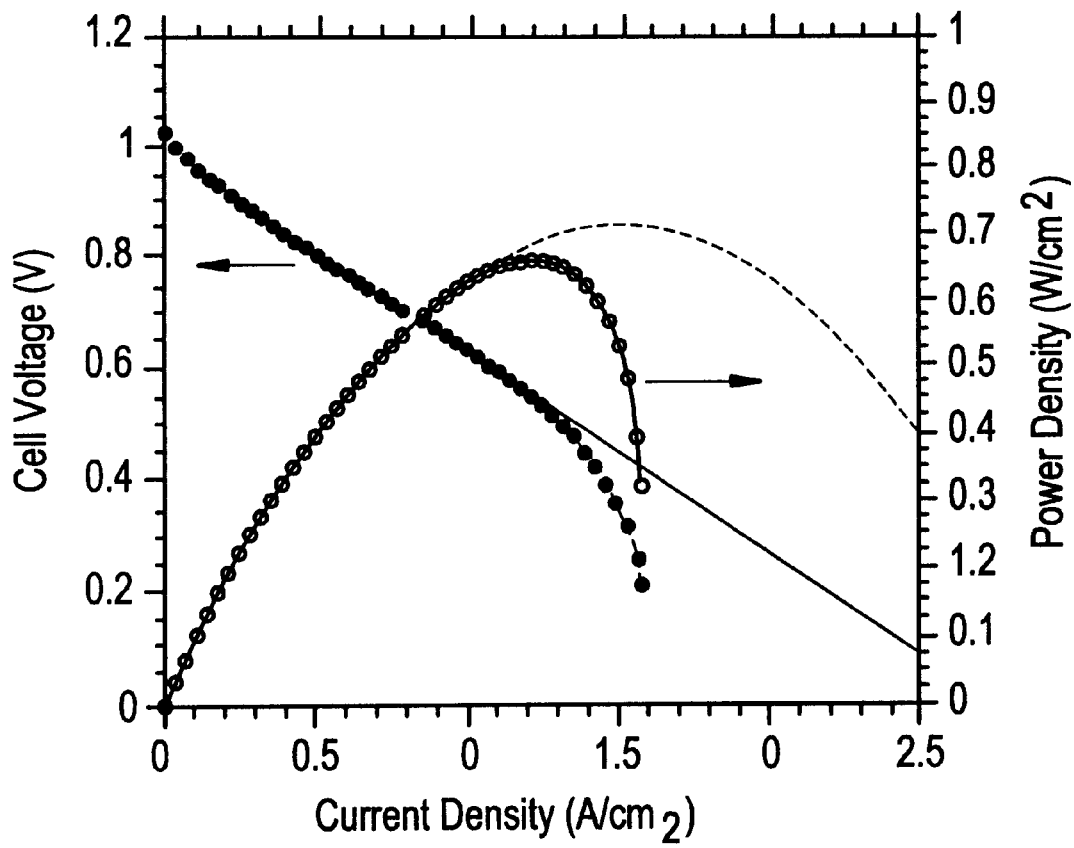

The cell assembly was then cooled to room temperature and a 1M aqueous solution of praseodymium (Pr) nitrate and 1M cobalt (Co) nitrate was applied to the cathode. After allowing the cathode to dry for a few minutes, a 1M solution of Pr, Co, and Ag nitrates in water was applied to the cathode. The cell was then reheated to 800° C. After equilibration for 30 minutes at 800° C., the cell produced a peak power of 0.92 W/cm$^2$, ASR=0.25 ohm-cm$^2$ as illustrated in FIG. 2. After approximately 20 hours at 800° C., the cell produced a peak power of 0.74 W/cm$^2$, ASR=0.33 ohm-cm$^2$ as illustrated in FIG. 3. The cell was then operated continuously at a current density of 0.3 A/cm$^2$. After approximately 32 hours under load, the cell produced a peak power of 0.72 W/cm$^2$, ASR=0.33 ohm-cm$^2$ (FIG. 4). After 77 hours under load, the cell produced a peak power of 0.66 W/cm$^2$, ASR=0.35 ohm-cm$^2$ (FIG. 5).

Any electrocatalyst that can be formed by heat treating a solution precursor or the residue of evaporation of a solution precursor can be formed within the porous electrode structure by infiltrating the electrode with the solution precursor and then heat treating the fuel cell stack. Solution precursors to the electrocatalyst include aqueous or non-aqueous solutions of metal salts such as nitrates, acetates and citrates. Furthermore, any electrocatalyst that can be formed by deposition from or decomposition of a gas phase precursor can also be introduced within the porous electrode structure by infiltrating the electrode with said gas phase precursor. While the above example describes the introduction of an electrocatalyst into a porous cathode, the same approach can be used to introduce an electrocatalyst into a porous anode.

Adding the electrocatalyst after the SOFC stack is assembled improves stack performance by reducing the catalyst particle size and eliminating high temperature reactions between the catalyst and other stack components allowing the use of more active catalyst previously considered incompatible.

Figure 6:
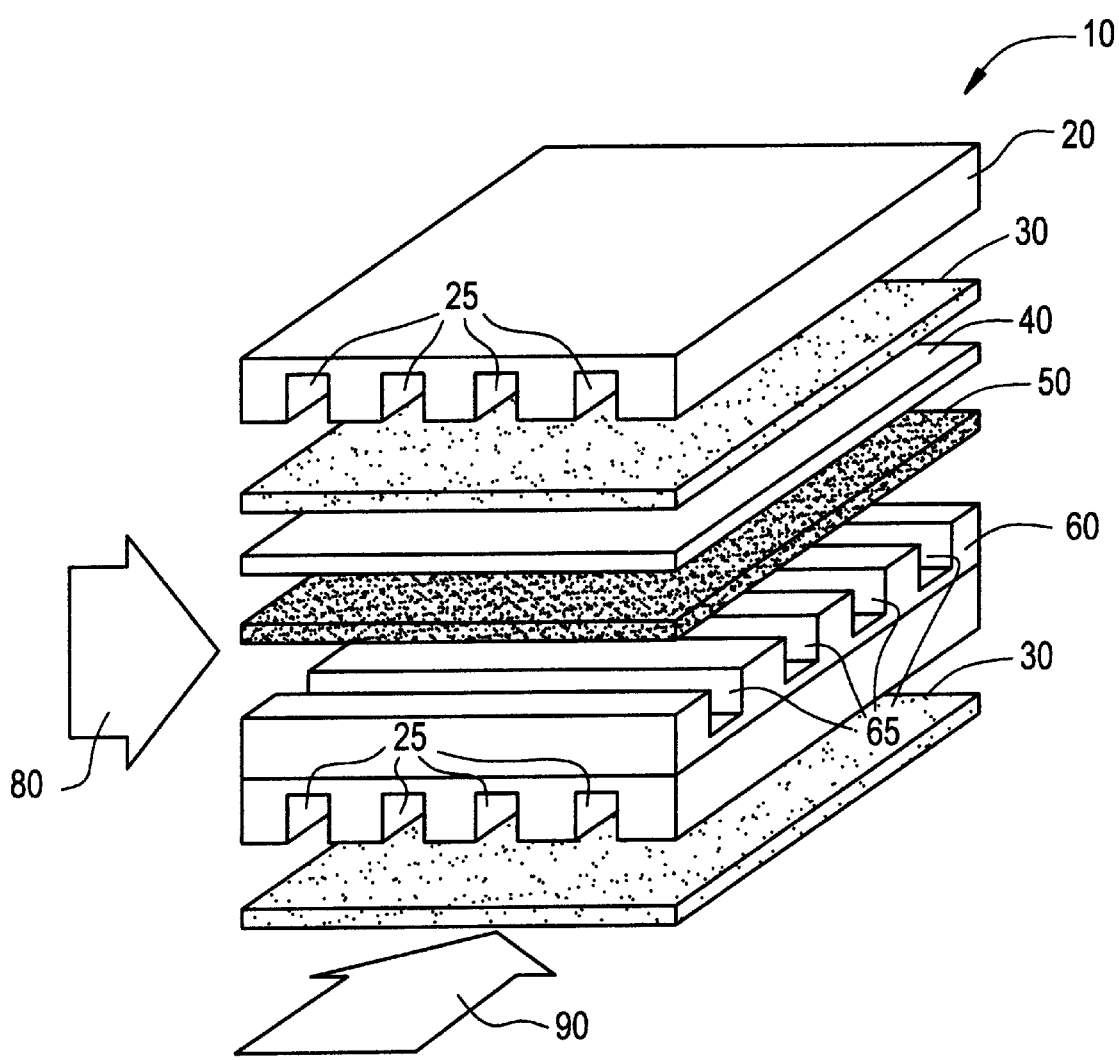
FIG. 6 is an exploded schematic illustration, in perspective, and prior to assembly of a portion of a crossflow flat plate design, planar solid-oxide fuel cell (SOFC) configuration made according to the invention.

Referring now to FIGS. 6–9, there are shown several embodiments of planar solid-oxide fuel cell stacks having the composite electrode structure according to the present invention. Referring particularly to FIG. 6, there is shown an exploded schematic illustration, in perspective and prior to assembly, of a portion of a crossflow flat plate design, planar solid-oxide fuel cell (SOFC) configuration, generally designated 10. The flat plate design planar SOFC 10 comprises several elements stacked one upon the other in a repeating pattern or unit. Starting at the top of FIG. 6, there is provided a first end plate 20 having a plurality of passageways 25 provided therein which permit an oxidant 80 such as air or $O_2$, or a fuel 90, such as $H_2$ or CO to pass therethrough in intimate contact with the next layer. In FIG. 6, the passageways 25 of first end plate 20 are adjacent a next layer comprising an anode electrode 30 advantageously made of Ni—$ZrO_2$ cermet. Anode layer 30 is, in turn, in direct contact with a solid electrolyte 40 advantageously made of $Y_2O_3$ stabilized $ZrO_2$. The solid electrolyte layer 40 separates the anode layer 30 from a next layer comprising the cathode electrode 50. Finally, a bipolar separator plate 60 is provided adjacent to cathode 50. Bipolar separator plate 60 is also provided with a plurality of passageways 65 and 25 to provide for flow of an oxidant 80 and/or fuel 90 therethrough in intimate contact with either of the layers adjacent bipolar separator plate 60. As shown, passageways 25 convey the fuel 90 therethrough in intimate contact with adjacent anode layers 30, while passageways 65 convert the oxidant 80 therethrough in intimate contact with adjacent cathode layers 50. The planar SOFC configuration then repeats, as shown in FIG. 6.

Figure 7:
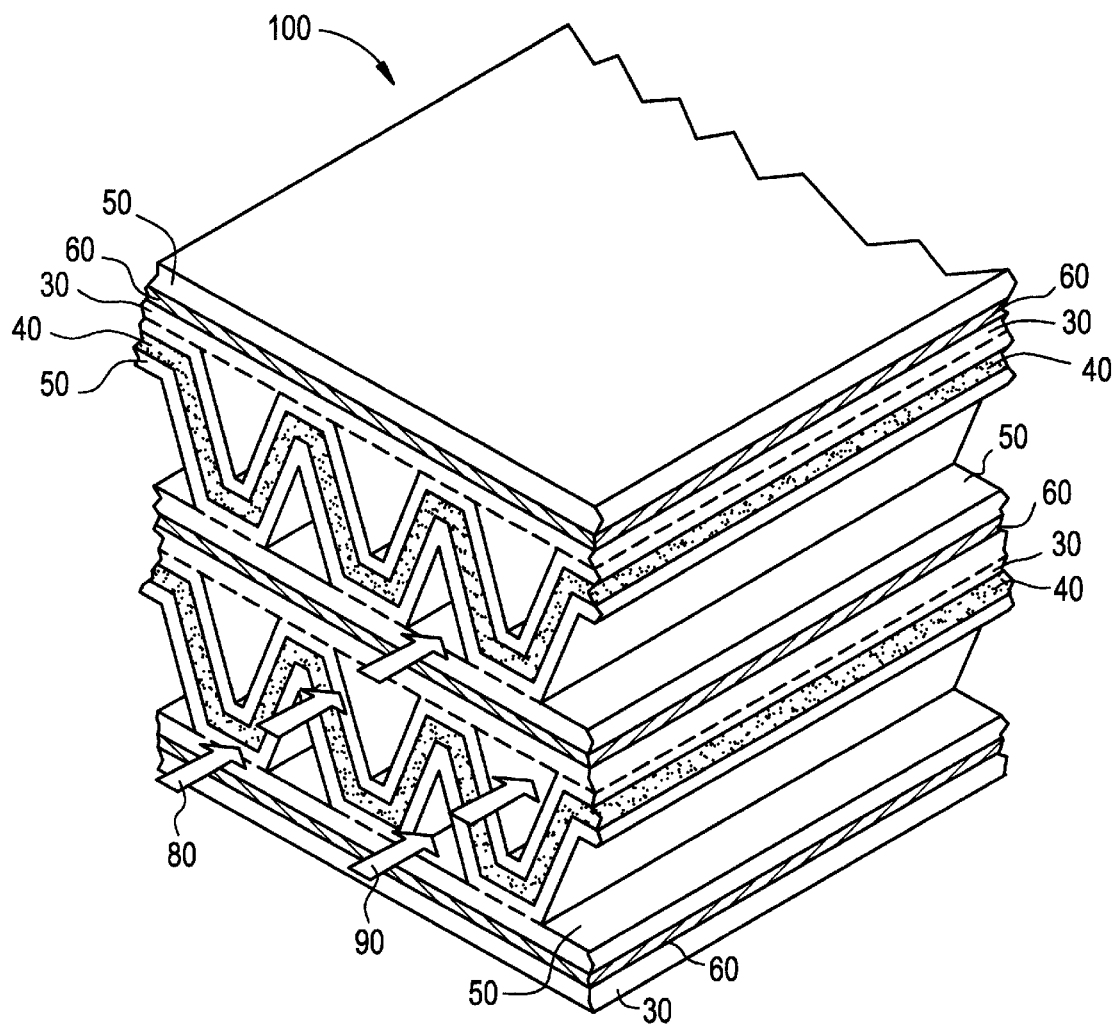
FIG. 7 is a schematic illustration, in perspective, of a portion of a corrugated, co-flow, monolithic solid-oxide fuel cell design made according to the invention.
Figure 8:
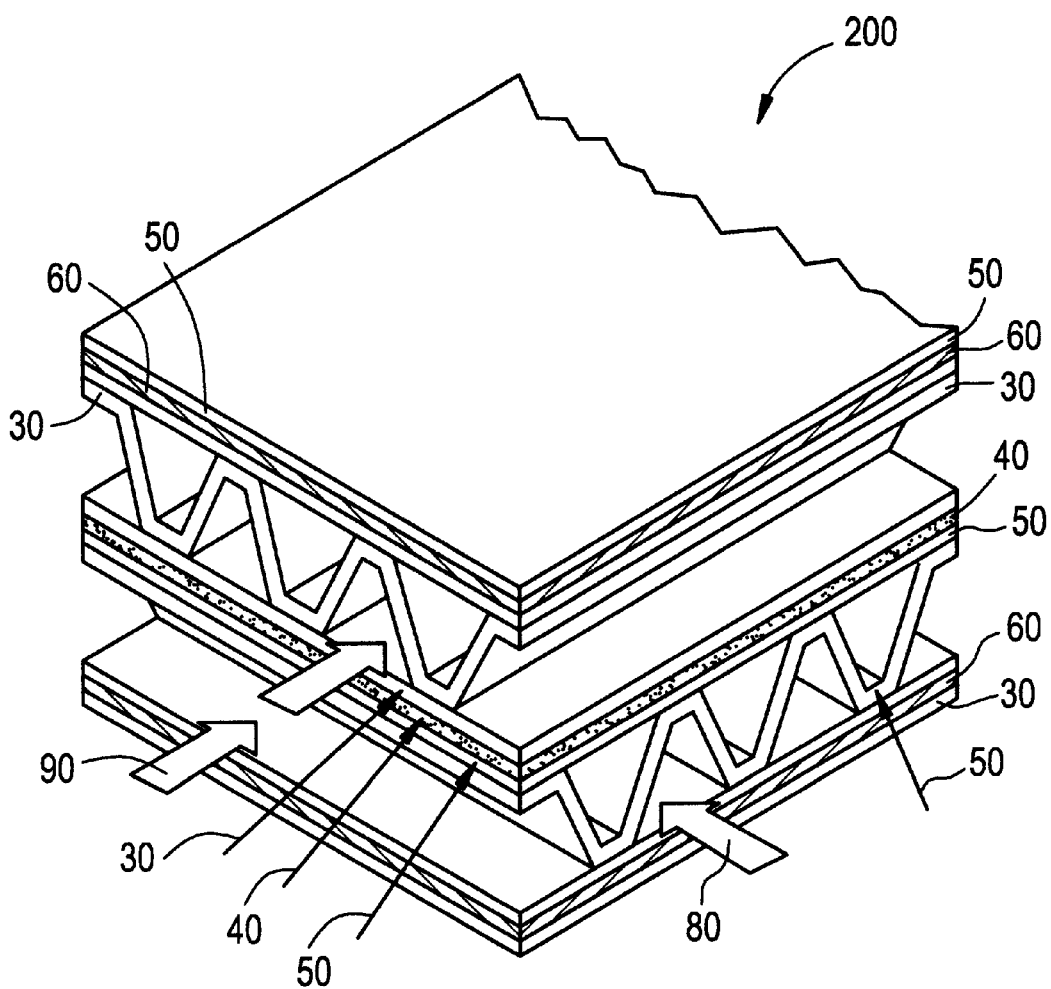
FIG. 8 is a schematic illustration, in perspective, of a portion of a corrugated, crossflow, monolithic solid-oxide fuel cell design made according to the invention.

FIGS. 7 and 8 illustrate other embodiments, and represent schematic perspective views of a portion of a corrugated, monolithic, solid-oxide fuel cell (SOFC) design made according to the invention. FIG. 7 illustrates a co-flow design 100, wherein oxidant 80 and fuel 90 flow through the SOFC 100 in directions substantially parallel to each other, while FIG. 8 illustrates a crossflow design 200 with respect to the flow of oxidant 80 and fuel 90 therethrough (i.e., the oxidant 80 and fuel 90 flow through the SOFC 200 substantially at right angles with respect to one another). As shown in FIGS. 7 and 8, the bipolar separator plate 60 may also be referred to as an interconnect 60 emphasizing its placement between anode 30 on one side of the interconnect 60 and cathode 50 on the opposite side of the interconnect 60. Interconnect layers 60 are placed between the anode 30 and cathode 50 layers of adjacent cells or repeating units to provide electrical connections from cell to cell and to serve as a barrier between the cells to prevent the migration of fuel or oxidant therebetween.

Figure 9:
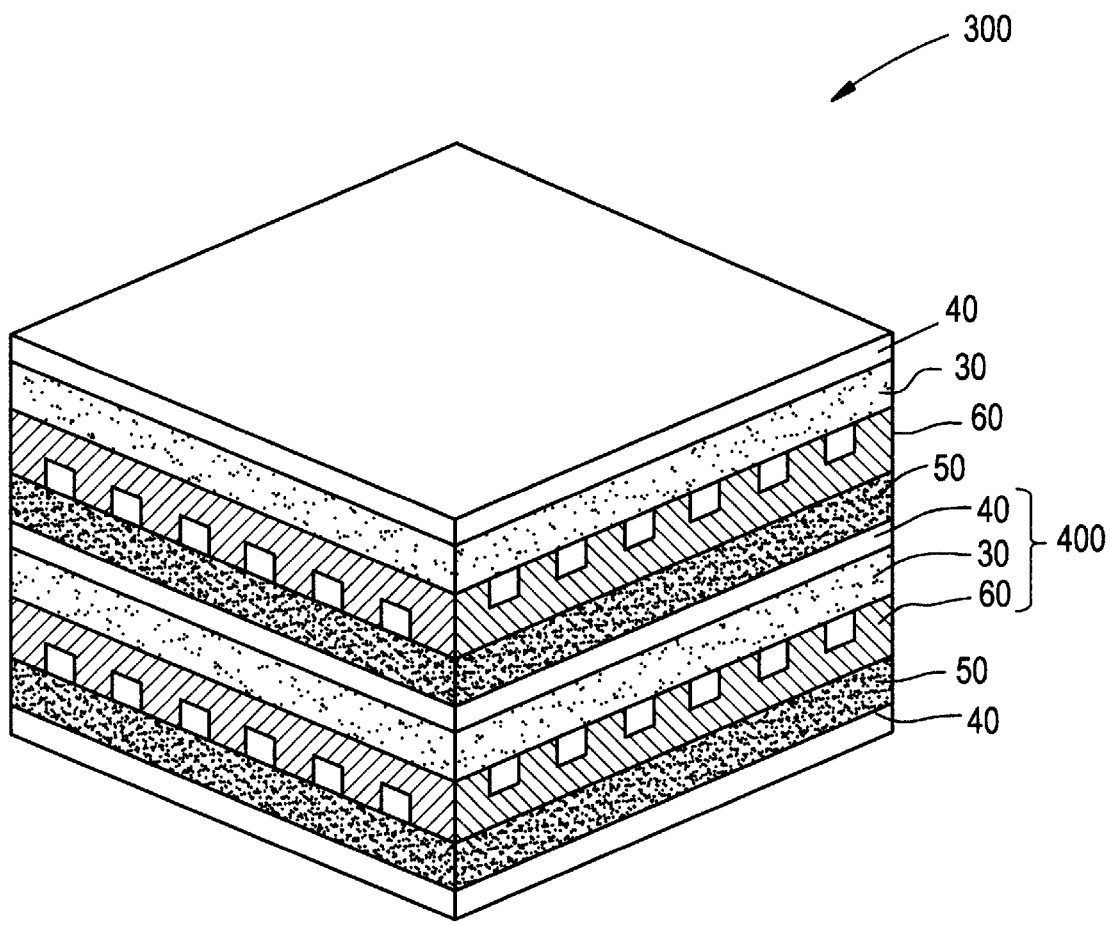
FIG. 9 is a schematic illustration, in perspective, of a portion of the crossflow flat plate design, planar SOFC configuration, after assembly, made according to the invention.

Finally, referring to FIG. 9 there is shown a schematic illustration, again in perspective, of a portion of a crossflow flat plate design, planar SOFC configuration 300, after it has been assembled according to the invention. As shown, the layers of repeating cell unit 400 comprise cathode 50, electrolyte 40, anode 30, and interconnect element 60 which repeat as necessary to make the solid-oxide fuel cell 300.

While a specific embodiment of the invention has been shown and described in detail to illustrate the application of the principles of the invention, it will be understood that the invention may be embodied otherwise without departing from such principles.

We claim:

1. A solid oxide fuel cell stack, comprising:
   a plurality of internally manifolded fuel cells connected in series, each cell having an anode electrode and a cathode electrode;
   at least one of a fuel gas or oxidant gas connection, connected to the fuel cells;
   at least one electrode in the cell being a porous composite of a contiguous network of an ionically conductive phase, a contiguous network of an electrically conductive phase, and an active electrocatalytic phase dispersed in the electrode in contact with both conductive phases; and
   the electrocatalytic phase being formed by the process comprising infiltrating the electrode of the fuel cell stack with a catalyst precursor through the fuel gas or oxidant gas connection, followed by heat treating the fuel cell stack to form active particles of infiltrated electrocatalyst within the electrode.

2. The solid oxide fuel cell stack according to claim 1, wherein the catalyst precursor is a solution of a metal salt.

3. The solid oxide fuel cell stack according to claim 2, wherein the solution is a metal nitrate, acetate or citrate solution.

4. The solid oxide fuel cell stack according to claim 3, wherein the solution is a nitrate of at least one of Pr, Co or Ag.

5. The solid oxide fuel cell stack according to claim 1, wherein the ionically conductive phase comprises yttrium-stabilized zirconia, and the electronically conductive phase comprises lanthanum manganite, strontium-doped lanthanum manganite, praseodymium manganite, strontium-doped praseodymium manganite, or mixtures thereof.

6. The solid oxide fuel cell stack according to claim 1, wherein the electrocatalyst comprises $PrCoO_3$.

7. A process for making a solid oxide fuel cell stack having a plurality of internally manifolded fuel cells connected in series, each cell having an anode electrode and a cathode electrode, at least one of a fuel gas or oxidant gas connection connected to the fuel cells, at least one electrode in the cell being a porous composite of a contiguous network of an ionically conductive phase, a contiguous network of an electrically conductive phase, and an active electrocatalytic phase dispersed in the electrode in contact with both conductive phases, the process comprising:
   infiltrating an electrode of the fuel cell stack with a catalyst precursor through the fuel gas or oxidant gas connection; and
   heat treating the fuel cell stack to form active particles of infiltrated electrocatalyst within the electrode to form the eletrocatalytic phase.

8. The process according to claim 7, wherein the catalyst precursor is a solution of a metal salt.

9. The process according to claim 8, wherein the solution is a metal nitrate, acetate or citrate solution.

10. The process according to claim 9, wherein the solution is a nitrate of at least one of Pr, Co or Ag.

11. The process according to claim 7, wherein the ionically conductive phase comprises yttrium-stabilized zirconia, and the electronically conductive phase comprises lanthanum manganite, strontium-doped lanthanum manganite, praseodymium manganite, strontium-doped praseodymium manganite, or mixtures thereof.

12. The process according to claim 7, wherein the electrocatalyst comprises $PrCoO_3$.

13. A solid oxide fuel cell stack, prepared by a process which includes the steps of:
   infiltrating a plurality of fuel cells with a catalyst precursor, by introducing a solution or dispersion of the catalyst precursor into at least a portion of each cell through an oxidant gas or fuel gas inlet connected to each cell, wherein each cell is electrically connected in series to the cells adjacent thereto and has a composite structure comprised of a porous anode electrode, an electrolyte, and a porous cathode electrode; and
   heating the infiltrated fuel cells under conditions sufficient to form active particles of the catalyst dispersed within the porous composite structure.

14. The solid oxide fuel cell stack prepared by the process of claim 13, wherein the process further comprises the steps of assembling the plurality of cells together to make the stack while they are in the green state and then firing the assembled stack prior to infiltration.

15. The solid oxide fuel cell stack prepared by the process of claim 13, wherein the catalyst precursor is a precursor of an electrocatalyst.

16. A process for preparing a solid oxide fuel cell stack, which includes the steps of:

infiltrating a plurality of fuel cells with a catalyst precursor, by introducing a solution or dispersion of the catalyst precursor into at least a portion of each cell through an oxidant gas or fuel gas inlet connected to each cell, wherein each cell is electrically connected in series to the cells adjacent thereto and has a porous composite structure comprised of a porous anode electrode, an electrolyte, and a porous cathode electrode, and heating the infiltrated fuel cells under conditions sufficient to form active particles of the catalyst within the porous composite structure.

17. The process for preparing a solid oxide fuel cell stack according to claim 16, wherein the catalyst precursor is a precursor of an electrocatalyst.

18. A solid oxide fuel cell stack, comprising:

a plurality of manifolded fuel cells connected in series, each cell having an anode electrode and a cathode electrode;

at least one of a fuel gas or oxidant gas connection, connected to the fuel cells;

at least one electrode in the cell being a porous composite of a contiguous network of an ionically conductive phase, a contiguous network of an electrically conductive phase, and an active electrocatalytic phase dispersed in the electrode in contact with both conductive phases; and the electrocatalytic phase being formed by the process comprising infiltrating the electrode of the fuel cell stack with a catalyst precursor through the fuel gas or oxidant gas connection, followed by heat treating the fuel cell stack to form active particles of infiltrated electrocatalyst within the electrode.

19. A process for making a solid oxide fuel cell stack having a plurality of manifolded fuel cells connected in series, each cell having an anode electrode and a cathode electrode, at least one of a fuel gas or oxidant gas connection connected to the fuel cells, at least one electrode in the cell being a porous composite of a contiguous network of an ionically conductive phase, a contiguous network of an electrically conductive phase, and an active electrocatalytic phase dispersed in the electrode in contact with both conductive phases, the process comprising:

infiltrating an electrode of the fuel cell stack with a catalyst precursor through the fuel gas or oxidant gas connection; and heat treating the fuel cell stack to form active particles of infiltrated electrocatalyst within the electrode to form the eletrocatalytic phase.

* * * * *